United States Patent
LeKuch et al.

(10) Patent No.: US 6,867,765 B2
(45) Date of Patent: Mar. 15, 2005

(54) USE OF A PAPER PAD WITH UNIQUELY IDENTIFIED PAGES IN A DIGITIZER SYSTEM

(75) Inventors: Scott LeKuch, New York, NY (US); Ken Inoue, Elmsford, NY (US); Dan Peter Dumarot, Cornwall, NY (US); Mary R. Seminara, Ossining, NY (US); Sreenivasulu Kesavarapu, Terrytown, NY (US); John Peter Karidis, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 266 days.

(21) Appl. No.: 09/854,976

(22) Filed: May 14, 2001

(65) Prior Publication Data

US 2002/0041271 A1 Apr. 11, 2002

Related U.S. Application Data

(60) Provisional application No. 60/238,840, filed on Oct. 6, 2000, and provisional application No. 60/269,300, filed on Feb. 16, 2001.

(51) Int. Cl.$^7$ .................................................. G09G 5/00
(52) U.S. Cl. ........................ 345/173; 345/179; D14/454
(58) Field of Search ................................ 345/173, 179; D14/454

(56) References Cited

U.S. PATENT DOCUMENTS

| | | | | |
|---|---|---|---|---|
| 5,191,329 A | * | 3/1993 | Samreus ...................... | 341/20 |
| 5,333,209 A | * | 7/1994 | Sinden et al. ................. | 382/13 |
| 5,339,412 A | * | 8/1994 | Fueki .......................... | 395/600 |
| 5,357,061 A | * | 10/1994 | Crutchfield ................... | 178/18 |
| 5,629,499 A | * | 5/1997 | Flickinger et al. ........ | 178/18.01 |
| 5,631,741 A | * | 5/1997 | Matthews ..................... | 358/296 |
| 5,838,819 A | * | 11/1998 | Ruedisueli et al. ......... | 382/187 |
| 5,900,943 A | * | 5/1999 | Owen .......................... | 356/406 |
| 6,052,117 A | * | 4/2000 | Ohara et al. ................ | 345/173 |
| 6,204,457 B1 | * | 3/2001 | Shekhel et al. .......... | 178/19.01 |
| 6,529,920 B1 | * | 3/2003 | Arons et al. ............. | 715/500.1 |

* cited by examiner

Primary Examiner—Bipin Shalwala
Assistant Examiner—Tom Sheng
(74) Attorney, Agent, or Firm—Ohlandt, Greeley, Ruggiero & Perle, L.L.P.; Casey P. August

(57) ABSTRACT

The present invention pertains to an input system for inputting information from a user, the input device system including at least one sheet of a writing medium having a unique identifier located thereon, a stylus input device for writing on the writing medium and emitting one or more signals, a detector for detecting said unique page identifier and stroke information from said emitted signal and local storage for storing said detected stroke information, in association with the unique identifier of said writing medium.

20 Claims, 3 Drawing Sheets

USE OF A PAPER PAD WITH UNIQUELY IDENTIFIED PAGES IN A DIGITIZER SYSTEM

This applications claims the benefits of Provisional application Ser. Nos. 60/238,840, filed Oct. 6, 2000, and 60/269,300, filed Feb. 16, 2001

CROSS-REFERENCE TO RELATED APPLICATIONS

This application is related to U.S. Patent Application "EXTENDING THE GUI DESTOP/PAPER METAPHOR TO INCORPORATE PHYSICAL PAPER INPUT." Ser. No. 09/854,978, filed on even date herewith for D. Dumarot, et al.; U.S. Patent Application "DATA STEERING FLIP PEN SYSTEM." Ser. No. 09/854,979, filed on even date herewith for D. Dumarot, et al.; U.S. Patent Application "IMPROVED FRONT OF SCREEN, USER INTERFACE, AND NATIONAL LANGUAGE SUPPORT BY DOWNLODING BITMAPS FROM PC TO COMPANION DEVICE." Ser. No. 09/854,977, filed on even date herewith for D. Dumarot, et al.; and U.S. patent Application "DIGITIZER COMPANION SYSTEM TO EXTEND PC BATTERY LIFE", Ser. No. 09/854,980 filed on even date herewith for D. Dumarot, et al.

BACKGROUND OF THE INVENTION

1. Field of the Invention

The present invention relates to data input devices, and more particularly pertains to data input devices using an electronic pen input device.

2. Description of the Prior Art

Traditional computer system user interfaces have a limited range and type of acceptable inputs. Some newer types of user interfaces incorporate features that allow for some intuitive control of the computer devices and inputs thereto, but their functionality is limited by the discontinuity between the physical world in which the user is located and the virtual, electronic realm of computing devices.

Physical, written paper documents are easy to create using pen and paper, do not require a source of electric power, and allow free form drawing. Electronic documents, however, are becoming increasingly popular because they are easy to store, manipulate, duplicate, and transfer. Prior art systems have attempted to allow users to create free form documents using a paper and pen, and then convert the physical document to an electronic (virtual) form. It is known, for example, to scan a physical document, such as a sheet of typed or handwritten text into a computer system using a scanner, and to then convert the scanned sheet of text into a virtual document for display, storage, and manipulation of the virtual document.

It is known that digitizer systems can acquire handwritten input to render an electronic version of a physical writing. In digitizer systems heretofore, it is difficult to associate pages of a physical writing with pages of an electronic representation of the physical writings. For example, there exists the difficulty of accurately identifying and associating pages of a physical writing generated using the pen input device of the digitizer system with the proper pages of the electronic representation of the physical writing. Thus, accurate navigation of the electronic representation of the physical writing is difficult. A solution in a known digitizer system prohibits user access to a page after an electronic representation of that page has been created. Another purported solution of digitizer systems heretofore displays an image of the electronic representation of the written page on a display device so that a user can visually compare an image of the electronic representation of the writing and the physical writing for a match.

SUMMARY OF THE INVENTION

It is an objective of this invention to provide an input device system that accurately associates physical written information with an electronic representation thereof.

It is another objective of this invention to provide an input device system that allows as a user to intuitively and accurately access representations of a physical writing stored in memory of the input device system.

The foregoing and other problems are overcome and the objects of the invention are realized by methods and apparatus in accordance with the invention disclosed herein. The present invention pertains to an input system for acquiring handwritten input information from a user, the input device system including at least one sheet of a writing medium having a unique identifier located thereon, an electronic pen input device for writing on the writing medium and emitting one or more signals for generating stroke information from the emitted signal, a detector for detecting the unique page identifier and the stroke information, and local storage for storing the stroke information in association with the unique identifier of the writing medium.

The writing medium can be a pad of sheet material, such as paper, located on a digitizer tablet. The writing medium has a unique identifier located on the sheets thereof. The unique identifier of a sheet of the writing medium is detected by the input device system for association with the writings created the sheet using the electronic pen input device. Thus, specific pages of writings created using the electronic pen input device and stored by the input device system can be accurately referenced and accessed using the unique identifiers associated pages of the stored writings.

BRIEF DESCRIPTION OF THE DRAWINGS

The above set forth and other features of the present teachings are made more apparent in the ensuing Detailed Description of the Invention when read in conjunction with the attached Drawings, wherein.

DETAILED DESCRIPTION OF THE INVENTION

Figure 1:
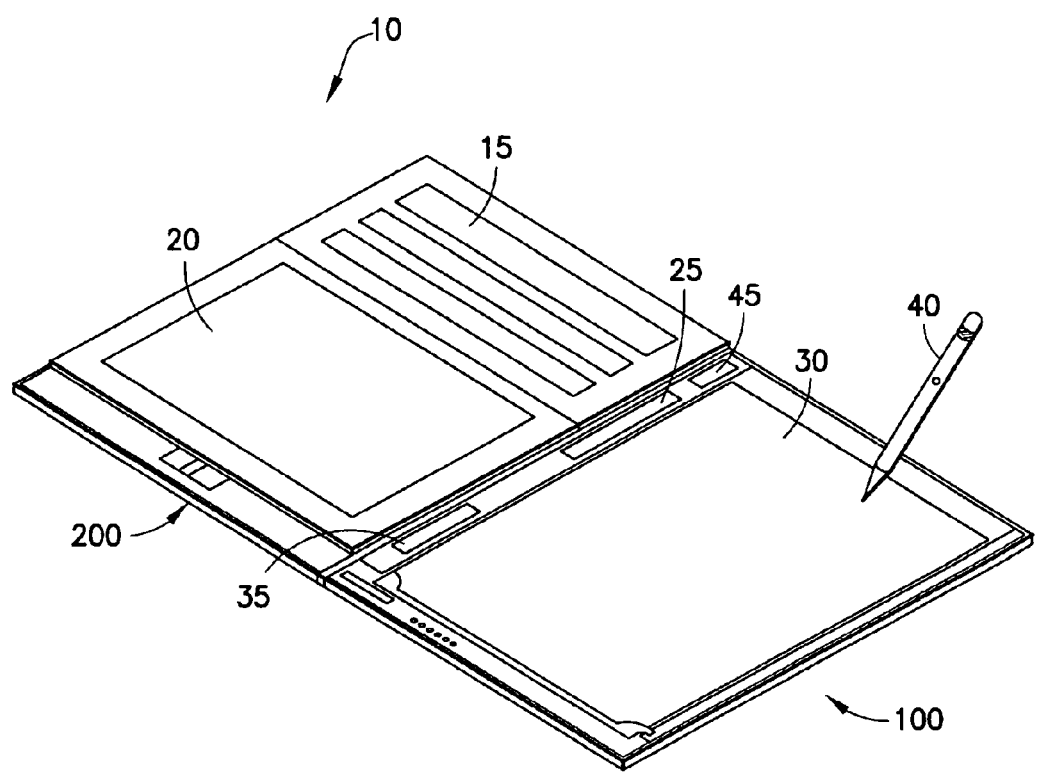
FIG. 1 depicts a computing system embodying user interface input systems in accordance with the teachings herein.

FIG. 1 is depicts an overview of an integrated computing system 10. Computing system 10 includes a computing device such as, but not limited to, a PC (personal computer) 200 interfaced with an input device system. The input device system is, in the presently preferred embodiment, a digitizer input system 100. PC 200 and digitizer input system 100 are shown configured in an integrated unit. The computing system 10 may be laid open as shown; folded shut; and folded over onto itself so that either PC 200 or digitizer input system 100 is operatively exposed for use by a user.

Although shown together in an integrated unit, PC 200 and digitizer input system 100 can optionally be housed independently of one another. Integration of the two systems facilitates the portable nature of computing system 10, but is not a requirement for computing system 10.

PC 200 preferably includes a display screen 20, a keyboard 15, a CPU for executing operating system and application instructions, random access memory (RAM) for temporary storage of data, read only memory (ROM) for permanent storage of data, which can include instructions for implementing the PC operating system, and an internal battery (not shown) for providing an electrical source of power to PC 200. PC 200 may also include, or provide means for coupling to, peripheral devices, such as, but not limited to a network card, memory storage/playback devices (e.g., a removable magnetic disk, readable/writeable DVD and CD-ROM players), etc.

Figure 2:
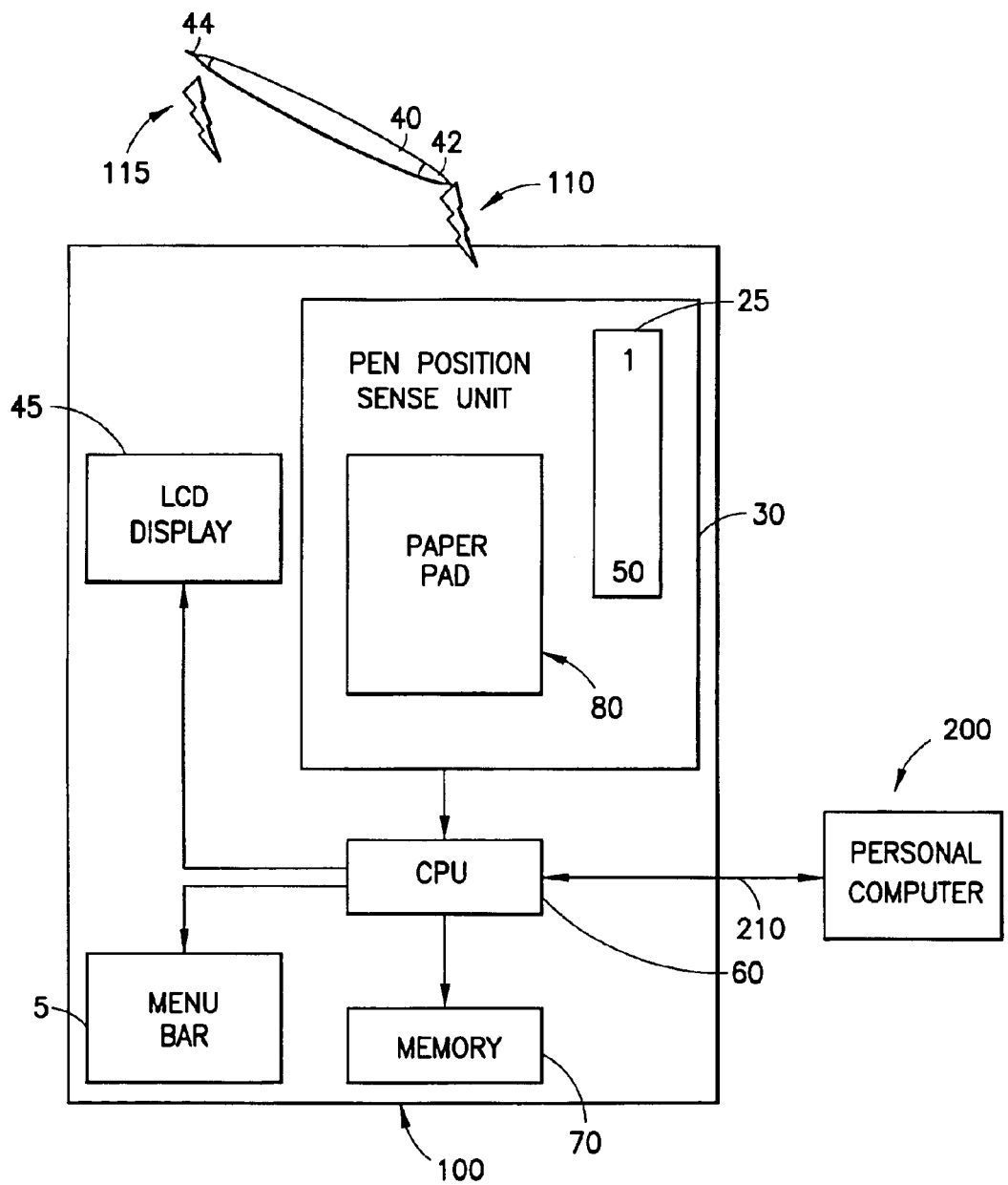
FIG. 2 is a simplified block diagram that illustrates the digitizer input system of FIG. 1 in greater detail.

Digitizer input system 100 includes a digitizer grid 30 that extends, preferably, substantially over the entire area of the digitizer input system 100, or a large portion thereof as depicted in FIG. 2, in order to provide a maximum input working area. The size of the digitizer grid 30 can be varied to meet the constraints of various applications. Digitizer input system 100 operates to track and determine the position of input pen 40 based on RF (radio frequency) signal(s) emitted by input pen 40. As used herein, input pen 40 is an electronic input pen. Digitizer grid 30 detects the position of input pen 40 based on the relative strength and position of the RF signals emitted by the input pen 40 in relation to digitizer grid 30. Note that the signal(s) emitted and detected by digitizer system 100 need not be limited to RF signals. Other signals such as, for example, ultrasonic and infrared signals (IR) can be employed.

The general operation of digitizer pads is known to those skilled in the art of computer input devices, and as such, will not be discussed in detail herein. Digitizer input system 100 tracks, determines, and records pen positions and pen strokes of input pen 40.

FIG. 2 provides a detailed view of the exemplary computing system 10 depicted in FIG. 1. With reference to FIG. 2, it is shown that digitizer input system 100 includes a CPU 60 and a memory 70. CPU 60 may be a general purpose microprocessor, though not limited to such, for providing system logic and control of digitizer input system 100. Memory 70 is preferably flash RAM, but other forms of memory storage may be used such as, but not limited to, static RAM or a hard drive. Memory 70 provides storage capability for storing pen positions and pen strokes of input pen 40. Digitizer input system 100 also preferably includes a display, such as an LCD display 45, for displaying information related to input data provided by input pen 40, a menu scroll bar 25, and a menu bar 35.

CPU 60 and memory 70 provide local processing and storage, respectively, of input data provided by input pen 40. Since digitizer input system 100 has its own local memory and processing means, PC 200 coupled to digitizer input system 100 need not be relied upon for processing and/or storage of input data received by digitizer input system 100.

Digitizer input system 100 and PC 200 are, in the presently preferred embodiment, coupled together through a bi-directional wired serial communication link 210. Communication link 210 is not limited to a wired connection or a serial communication protocol. Accordingly, communication link may be a wired or wireless communication link (e.g., IR or RF).

Paper pad 80 can be a conventional pad of paper having multiple pages is positioned during use on top of digitizer input system 100. Paper pad 80, positioned atop digitizer grid 30, can be written on by a user of computing system 10. Each time the tip of input pen 40 is pressed to paper pad 80, the digitizer input system 100 begins recording the positional data points detected from the emitted RF signals from input pen 40 and continues to record the input pen 40 positional data until the tip of input pen 40 is lifted from paper pad 80. The set of input pen 40 positional data points from the time of tip press to the time of tip lift is considered to be a pen stroke. Pen strokes written and drawn on paper pad 80 are communicated to digitizer input system 100, even through multiple pages of paper pad 80, by the RF signals emitted from input pen 40. The RF signals emitted from input pen 40 include positional data of the "pen strokes" executed by the user of input pen 40. Thus, the writings and drawings made on paper pad 80 can be conveyed by input pen 40, processed by CPU 60, and stored in memory 70 as an electronic (i.e., virtual) representation of writings and drawings created by the user on paper pad 80.

Input pen 40 preferably has two different tips, tip 42 and tip 44. Dual-tipped input pen 40, as shown in FIG. 2, preferably emits a unique RF signal 110 from tip 42 that is detected by digitizer input system 100. Detected RF signal 110 is used for determining the position of input pen 40 when tip 42 is active. Preferably, input pen 40 emits a different RF signal 115 from tip 44 that is detected by digitizer input system 100. Detected RF signal 110 is used for determining the position of input pen 40 when tip 42 is active. Tip 42 can be, though not necessarily, an inking tip for writing and drawing on paper pad 80. Tip 44, emitting RF signal 115, preferably, but not necessarily, contains a non-inking tip that is used for controlling user input functions of PC 200 coupled to digitizer input system 100. Each of tips 42 and 44 preferably includes a mechanism for detecting when the tip 42 or 44 is active. That is, each tip includes a mechanism for detecting when the tip is pressed down on paper pad 80 (or other writing medium) or digitizer grid 30 directly.

An exemplary RF signal 110 emitted by tip 42 can be a 500 kHz RF signal that is modulated to 480 kHz when tip 42 is active. Exemplary RF signal 115 emitted by tip 42 can be a 450 kHz RF signal that is modulated to 460 kHz when tip 42 is actively used. Digitizer grid 30 detects the relative strength and position of the input pen's emitted RF signals as discussed above. Digitizer grid 30 also detects which tip 42 or 44 is being actively used as indicated by the modulated RF signal detected by digitizer grid 30. The positional data of input pen 40 is communicated to a data control device. In computing system 10 of the present example, the data control device is implemented by microprocessor unit CPU 60. CPU 60, in the presently preferred embodiment, can be programmed to perform different functions. CPU 60 can control the transfer of input data to, for example, local memory 70 or to PC 200.

While input pen 40 shown in FIG. 2 has two tips located on opposite ends of input pen 40, input pen 40 may have one or more tips located on the same end thereof. The various tips of input pen 40, or other control mechanisms, may generate additional signals detectable and useable by digitizer input system 100 and/or computing system 10. Selection amongst the various input pen tips by the user preferably only requires a natural, intuitive user action, such as, for example, pressing a small switch located on the barrel of the input pen, in accordance with the teachings herein.

As was stated above, the signals emitted by tips 42 and 44 are not restricted to RF signals, other types of energy signals may be emitted, such as but not limited to, IR (infrared) and ultrasonic signals. The type of control and user manipulation used for control of the data transfer may be varied.

Written input may be forwarded for storage in a device coupled to digitizer input system 100, such as PC 200, optionally without buffering or caching in local memory 70, as the user writes on paper pad 80. To provide this functionality, CPU 60 can be programmed to route written input to PC 200 for storage as an electronic version of the user's physical writings.

In accordance with the present invention, information written on the pages of paper pad 80 is accurately correlated with an electronic representation of the physical page stored in digitizer input system 100. Digitizer input system 100, accurately associates information written on a page of paper pad 80 having a unique identifier so that an accurate representation of the written page can be generated, recorded, and retrieved by the digitizer input system 100. The written information is preferably stored in local memory 70 but can be forwarded to PC 200 for storage. Although the writing medium is preferably a paper pad, the present invention is not constrained to using paper as the writing medium. Accordingly, paper, Mylar, or other materials can be used.

In order to accurately track the pages of paper pad 80 being written on by a user, the sheets of paper pad 80 are preferably provided with a unique identifier pre-printed thereon. The unique identifier can be any type of a graphic or alphanumeric, or a combination thereof. Thus, the unique identifier printed on the individual pages of paper pad 80 can be, but is not limited to, a number, a bar code, an outline of a number, a coded dot pattern, an image of a form, etc.

In accord with the present invention, the unique page identifier is printed in a specified region of paper pad 80. The particular region of the paper pad 80 having the unique page identifier printed thereon can be a predetermined location or the location can be specified by the user. A user can specify the location for the unique identifier region by designating a region of paper pad 80 as the unique identifier region using input pen 40 and/or a control. The control for specifying the unique identifier region can be presented in the form of an icon and selectable from menu bar 35. For example, the unique identifier region can be designated by selecting the appropriate icon from menu bar 35 and by touching the tip of input pen 40 to the desired region of paper pad 80. The user may also specify the location for the unique identifier by performing a particular sequence of operations with the input pen device 40, such as, double-tapping paper pad 80 with input pen 40.

In an aspect of the present invention, the unique identifier located on a sheet of paper pad 80 is specified to digitizer system 100 by tracing over the number or other unique identifier provided on paper pad 80. It should be appreciated by those skilled in the art that other methods of specifying the unique identifier to digitizer system 100 can include, but are not limited to verbally identifying the unique identifier to digitizer input system 100 optionally equipped for speech recognition, scanning the unique identifier with input pen 40 thus provided with a scanning tip (not shown), entering the unique identifier via a keypad, and entering the unique identifier through a menu selection or a control manipulated by the user.

Whether the user specifies the location for the unique identifier or the location is predetermined by digitizer system 100, it is preferable that when the input pen 40 is detected in the region of paper pad 80 specified for containing the unique identifier that the pen stroke information received from input pen 40 is interpreted by CPU 60 as unique identifier information. Thus, when a number "2" is written in the unique identifier region (e.g., the lower left hand corner of paper pad 80), CPU 60 automatically interprets the received pen stroke information to determine that a number "2" is the unique identifier for the sheet of paper pad 80 being written on. Therefore, digitizer input system 100 will associate subsequently received pen stroke information with page 2 of paper pad 80 (until another page identifier is specified). The unique identifier, in the present example, the number two (2), is associated with the written input on page two (2) of paper pad 80 and the stroke information recorded by digitizer input system 100.

The determination and storage of unique page identifiers for the sheets of paper pad 80 allows the digitizer input system 100 to accurately correlate input information written on the sheets paper pad 80 having unique identifiers with the electronic representations thereof that are generated by stroke information from input pen 40 and digitizer input system 100. Thus, the digitizer input system 100 is able to create and accurately correlate writings made on a page of paper pad 80 using input pen 40 with an electronic representation of the page. Furthermore, an electronic version of a physical writing can thus be accurately reconstructed and accessed by the digitizer input system 100 by referencing the unique identifier.

Referring to FIG. 1, LCD screen 45 displays, among other items, the unique identifier currently associated with a sheet of paper pad 80. The unique identifier is automatically displayed in LCD 45. LCD screen 45 is preferably positioned in close proximity to paper pad 80 and, in particular, in close proximal relationship to the region of paper pad 80 specified for containing the unique page identifier. Thus located, the user can readily confirm that digitizer input system 100 is correctly associating written input with the proper unique page identifier. The user need not reference a connected computing device, such as, for example, PC 200 or a monitor to confirm that the unique identifier is correctly associated with the intended physical page.

Slider bar 25 provides a control for the user to indicate the page they are working on, as well a control to "jump" from one page to another page of a stored electronic document. For example, if the user touches a tip of input pen 40 to the top of slider bar 25, the CPU 60 determines that the user wishes to write on page one (1) of paper pad 80 and will associate pen strokes subsequently entered on paper pad 80 with page one (1) of the electronic document in its memory 70. Similarly, if the user touches a tip of input pen 40 to the bottom of slider bar 25, CPU 60 determines that the user wishes to write on, for example, page fifty (50) of paper pad 80. To select any other page, the user can selectively slide a tip of input pen 40 within slider bar 25 to scroll among the pages of the stored stroke information.

Figure 3:
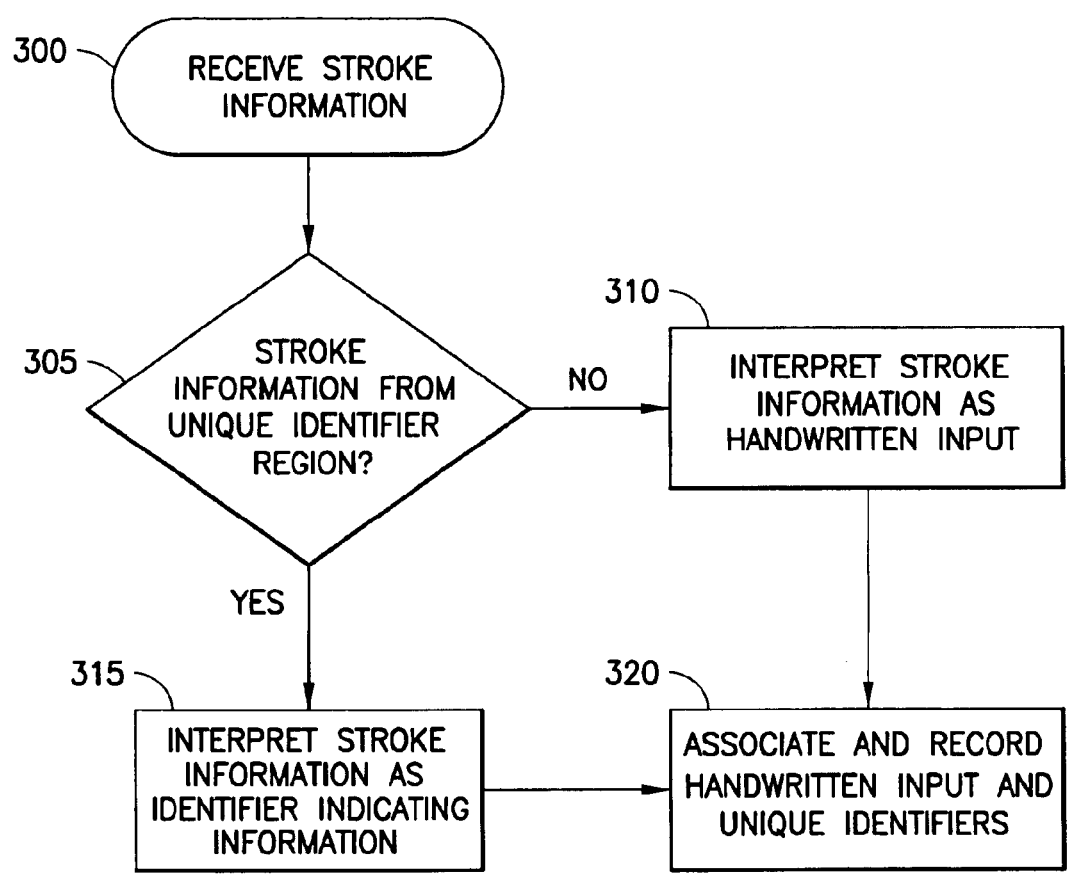
FIG. 3 is a flow diagram of an exemplary method used by the digitizer input system to associate pages of a physical writing with an electronic representation of the writing in accordance with the teachings herein.

FIG. 3 is a logical flow diagram showing an exemplary method of the present invention. In a first step, the digitizer input system 100 receives stroke information from input pen 40 (step 300). A determination is then made as to whether the received stroke information is from the area of paper pad 80 specified, either by the user or predetermined, as the unique identifier location region (step 305). A determination by CPU 60 that the stroke information is not from the unique identifier location region causes CPU to interpret the received stroke information as handwritten input (step 310). However, a determination that the stroke information is from the unique identifier location region in step 305 causes CPU 60 to interpret the received stroke information as unique identifier indicating information (step 315). Thus, input digitizer 100 will attempt to correlate the received stroke information to a unique identifier. Therefore, receipt of a number "5" will be interpreted as the identifier, number "5". The number "5" is then associated with written input and recorded by input digitizer system 100 (step 320). As stroke information is received, it is evaluated and interpreted. A change in the identifier (i.e., entry of a new and different identifier) will result in the written input being associated with the new identifier.

In addition to accurately associating a unique identifier with the physical pages of paper pad 80 and the representations thereof, digitizer input system 100 can also associate other information, such as a time stamp, with the written input information. Associated unique identifiers and input information detected and recorded by the digitizer input system 100 can be used by the input system 100 and/or PC 200.

Although described above in the context of specific input device systems and companion system, those skilled in the art should appreciate that these are exemplary and indicative of presently preferred embodiments of these teachings, and are not to be read or construed in a limiting sense upon these teachings. For example, the input pen 40 may have one or more tips located on the same or opposite ends; the writing medium for use in an input device system is not limited to paper, as the writing medium may also include other materials, such as a transparency.

The present invention may be implemented by a storage medium (e.g., a removable memory card or hard disk) having computer readable program instructions embodied therein for executing the methods of the present invention. The computer readable medium can be read and executed by the CPU 60. Accordingly, the association of a unique identifier on a sheet of paper pad 80 and written information generated thereon using input pen 40 is accomplished by program instructions, responsive to an indication of a unique identifier located on a sheet of the paper pad 80 in a specified region of the pad and a detection of the unique identifier in the region; program instructions for associating the representation of the written information generated with pen input device 40 on paper pad 80 with the unique identifier; and recording the association of the unique identifier and the representation of the written information in memory of digital input system 100.

The various aspects of the teachings herein may or may not be combined in accordance with the scope of the teachings herein and the claims appended hereto. Thus, while the invention has been particularly shown and described with respect to preferred embodiments thereof, it will be understood by those skilled in the art that changes in form and details may be made therein without departing from the scope and spirit of the invention.

What we claim is:

1. A digitizer input system for inputting written information from a user, said input device system comprising:
    at least one sheet of a writing medium having a pre-printed unique identifier located thereon;
    an electronic pen for writing on said writing medium and emitting one or more signals for generating pen stroke information;
    a detector for detecting said pre-printed unique identifier and said pen stroke information from said emitted signals, wherein said pre-printed unique identifier is indicated to said input system by tracing over said pre-printed unique identifier; and
    local storage for storing said detected pen stroke information, in association with said pre-printed unique identifier of said writing medium;
    wherein said input system is interfaced with a display device for displaying a representation of said stroke information, said representation being associated with a page of said writing medium based on said pre-printed unique identifier.

2. The input system of claim 1 wherein said input system is coupled to a computing device.

3. The input system of claim 1 wherein said pre-printed unique identifier is at least one of an image or an alphanumeric string.

4. The input system of claim 1 further comprising a display for displaying said pre-printed unique identifier.

5. The input system of claim 1 wherein a time stamp is associated with said detected pen stroke information.

6. The input system of claim 1 wherein said pre-printed unique identifier is used to access stored pen stroke information associated with said pre-printed unique identifier.

7. The input system of claim 1 further comprising a user control for indicating on which sheet of said writing medium the user is writing.

8. The input system of claim 7 wherein said user control comprises a slider bar.

9. A method of using an input device system, said method comprising the steps of:
    indicating a pre-printed unique identifier located on a writing medium to said input system using an electronic pen for writing on said writing medium, the pen emitting one or more signals for generating pen stroke information therefrom;
    detecting said pre-printed unique identifier information, wherein said pre-printed unique identifier is indicated to said input system by tracing over said pre-printed unique identifier;
    detecting said pen stroke information that is derived from said emitted signal;
    storing said detected pen stroke information in association with said detected pre-printed unique identifier; and
    displaying a representation of said pen stroke information, said representation being associated with a page of said writing medium based on said pre-printed unique identifier.

10. The method of claim 9 further including the step of displaying said pre-printed unique identifier associated with a sheet of said writing medium.

11. The method of claim 9 wherein a user specifies to said input system said location region of said pre-printed unique identifier on the writing medium.

12. The method of claim 9 further including the step of associating a time stamp with said detected pen stroke information.

13. The method of claim 9 further comprising determining a sheet of said writing medium on which said electronic pen is writing by detecting a manipulation of a user control.

14. The method of claim 13 wherein said manipulation of said user control comprises touching a slider bar.

15. A storage medium having computer readable program instructions embodied therein for inputting information from a user to an input system, said storage medium comprising:
    program instructions that are responsive to an indication of a pre-printed unique identifier located on a writing medium, wherein said pre-printed unique identifier is indicated to said input system by tracing over said pre-printed unique identifier, said program instructions further being responsive to a detection of said pre-printed unique identifier information and to detected pen stroke information derived from pen emissions during writing;

program instructions for storing said stroke information in association with said detected pre-printed unique identifier; and program instructions for displaying a representation of said pen stroke information, said representation associated with a page of said writing medium based on said pre-printed unique identifier.

16. The storage medium of claim 15 further including program instructions for displaying said pre-printed unique identifier associated with a sheet of said writing medium.

17. The storage medium of claim 15 further including program instructions for accepting user specification to said input system of said location region of said pre-printed unique identifier on the writing medium.

18. The storage medium of claim 15 further including program instructions for associating a time stamp with said detected stroke information.

19. The storage medium of claim 15 further including program instructions for determining a sheet of said writing medium on which said electronic pen is writing by detecting a manipulation of a user control.

20. The method of claim 19 wherein said manipulation of said user control comprises touching a slider bar.

* * * * *